US010990079B2

(12) United States Patent
Yorozu

(10) Patent No.: US 10,990,079 B2
(45) Date of Patent: Apr. 27, 2021

(54) FABRICATING APPARATUS, FABRICATING SYSTEM, AND FABRICATING METHOD

(71) Applicant: Yasuaki Yorozu, Kanagawa (JP)

(72) Inventor: Yasuaki Yorozu, Kanagawa (JP)

(73) Assignee: RICOH COMPANY, LTD, Tokyo (JP)

(*) Notice: Subject to any disclaimer, the term of this patent is extended or adjusted under 35 U.S.C. 154(b) by 0 days.

(21) Appl. No.: 16/291,125

(22) Filed: Mar. 4, 2019

(65) Prior Publication Data

US 2019/0275742 A1    Sep. 12, 2019

(30) Foreign Application Priority Data

Mar. 7, 2018  (JP) .............................. JP2018-040758

(51) Int. Cl.

| G05B 19/4093 | (2006.01) |
| B29C 64/393 | (2017.01) |
| B29B 7/72 | (2006.01) |
| B33Y 50/02 | (2015.01) |
| B29C 64/153 | (2017.01) |
| B29C 64/118 | (2017.01) |
| B33Y 40/00 | (2020.01) |
| B33Y 10/00 | (2015.01) |

(Continued)

(52) U.S. Cl.
CPC .......... G05B 19/4093 (2013.01); B29B 7/72 (2013.01); B29C 64/118 (2017.08); B29C 64/153 (2017.08); B29C 64/393 (2017.08); B33Y 40/00 (2014.12); B33Y 50/02 (2014.12); B33Y 10/00 (2014.12); B33Y 30/00 (2014.12); B33Y 50/00 (2014.12); G05B 2219/49 (2013.01)

(58) Field of Classification Search
CPC ... B29C 64/393; B29C 64/118; B29C 64/153; B33Y 40/00; B33Y 50/02; B33Y 50/00; B33Y 30/00; B33Y 10/00; B29B 7/72; G01B 11/0608; G01B 11/24; G05B 19/4093; G05B 2219/49
See application file for complete search history.

(56) References Cited

U.S. PATENT DOCUMENTS

| 2002/0093115 | A1* | 7/2002 | Jang ....................... B33Y 30/00 264/113 |
| 2002/0104973 | A1 | 8/2002 | Kerekes |

(Continued)

FOREIGN PATENT DOCUMENTS

| JP | 2003-039562 | 2/2003 |
| JP | 2016-137653 | 8/2016 |

(Continued)

OTHER PUBLICATIONS

Extended European Search Report dated Jul. 17, 2019.

*Primary Examiner* — Christopher E. Everett
(74) *Attorney, Agent, or Firm* — Harness, Dickey & Pierce, P.L.C.

(57) ABSTRACT

A fabricating apparatus includes a fabricating device, a sensor, and a control unit. The fabricating device is configured to fabricate a fabrication layer according to fabrication data of a three-dimensional object. The sensor is configured to measure a shape of the fabrication layer. The control unit is configured to control the fabricating device according to the fabrication data and the shape of the fabrication layer measured with the sensor.

18 Claims, 9 Drawing Sheets

(51) Int. Cl.
*B33Y 30/00* (2015.01)
*B33Y 50/00* (2015.01)

(56) References Cited

U.S. PATENT DOCUMENTS

| | | | |
|---|---|---|---|
| 2004/0251581 A1* | 12/2004 | Jang | B29C 64/40 |
| | | | 264/497 |
| 2005/0288813 A1* | 12/2005 | Yang | B28B 1/001 |
| | | | 700/119 |
| 2014/0048970 A1* | 2/2014 | Batchelder | B29C 67/0055 |
| | | | 264/129 |
| 2015/0158249 A1* | 6/2015 | Goto | B29C 64/188 |
| | | | 264/40.1 |
| 2015/0174828 A1 | 6/2015 | Creuzer et al. | |
| 2015/0198943 A1 | 7/2015 | Kotlus | |
| 2015/0210011 A1 | 7/2015 | Conrow et al. | |
| 2015/0266242 A1* | 9/2015 | Comb | B29C 64/106 |
| | | | 264/40.1 |
| 2015/0328839 A1* | 11/2015 | Willis | G05B 19/4099 |
| | | | 700/98 |
| 2016/0136896 A1 | 5/2016 | Wighton | |
| 2016/0375640 A1 | 12/2016 | Cho et al. | |
| 2017/0050374 A1 | 2/2017 | Minardi et al. | |
| 2017/0057170 A1 | 3/2017 | Gupta et al. | |
| 2017/0182714 A1 | 6/2017 | Sato | |
| 2017/0355135 A1 | 12/2017 | Tombs | |
| 2018/0043631 A1* | 2/2018 | Heide | B33Y 50/02 |
| 2018/0072000 A1* | 3/2018 | Riemann | B33Y 30/00 |
| 2018/0169953 A1* | 6/2018 | Matusik | B29C 64/393 |
| 2019/0054700 A1* | 2/2019 | Chandar | B33Y 50/02 |

FOREIGN PATENT DOCUMENTS

| | | |
|---|---|---|
| JP | 2016-137654 | 8/2016 |
| JP | 2017-087578 | 5/2017 |
| JP | 2017-100309 | 6/2017 |
| JP | 2018-008403 | 1/2018 |
| WO | WO2015/081009 A1 | 6/2015 |

* cited by examiner

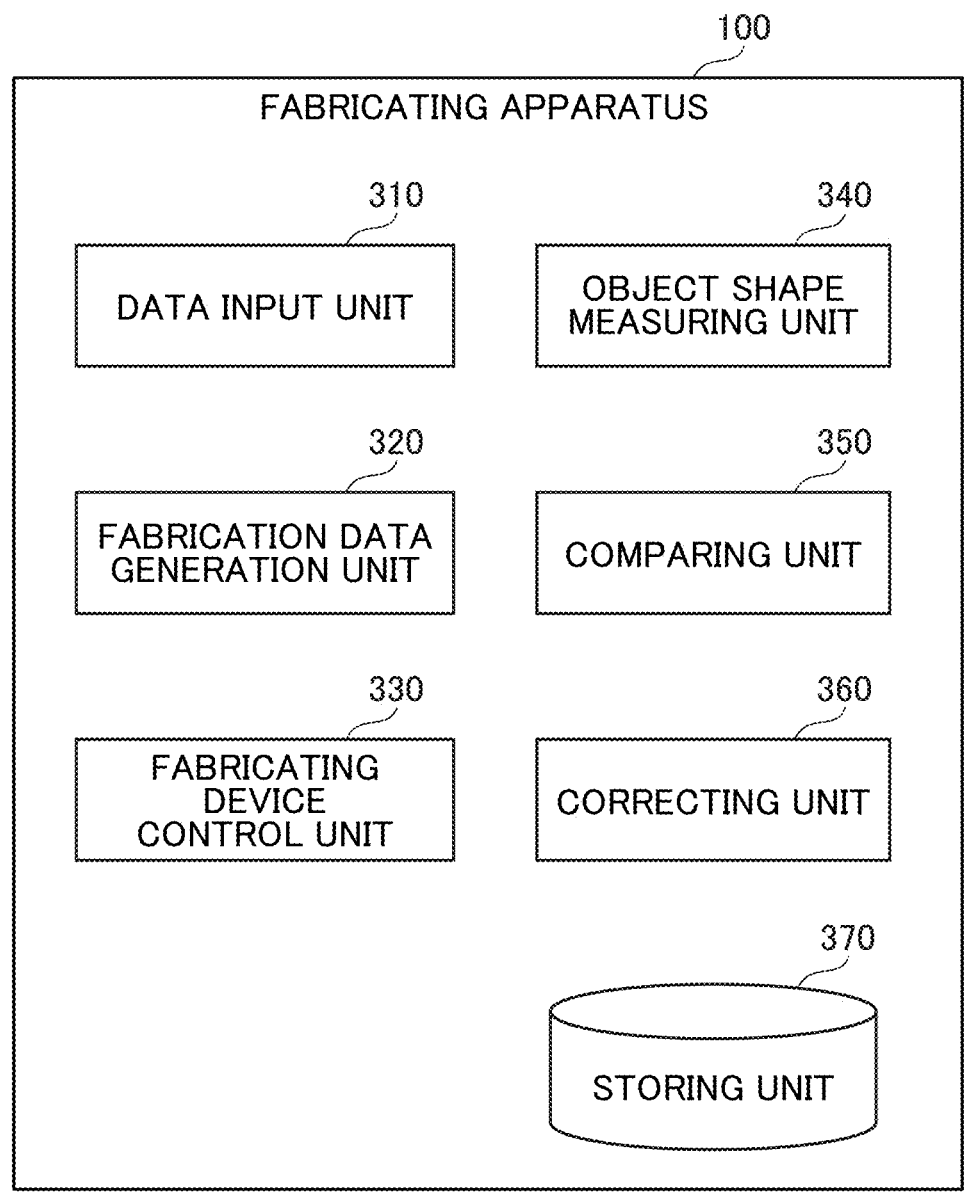

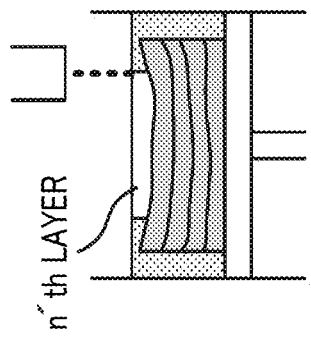 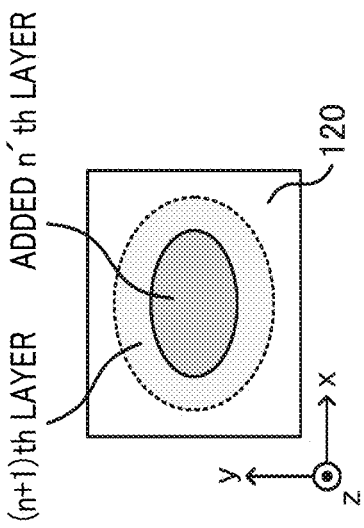
FIG. 7A  FIG. 7B
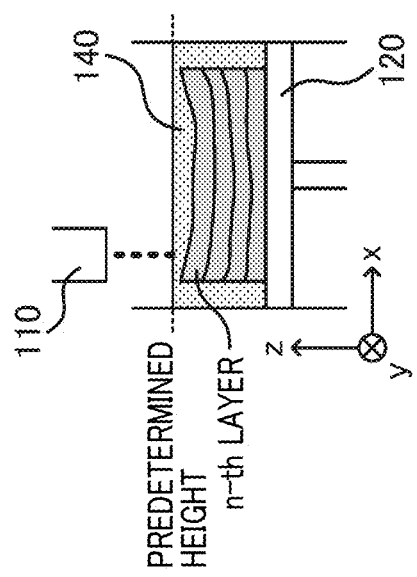 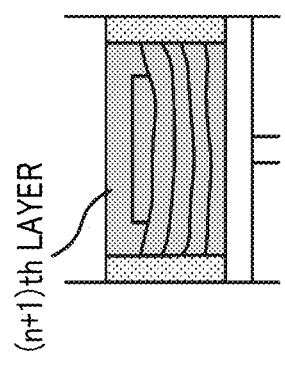
FIG. 7C  FIG. 7D

FABRICATING APPARATUS, FABRICATING SYSTEM, AND FABRICATING METHOD

CROSS-REFERENCE TO RELATED APPLICATION

This patent application is based on and claims priority pursuant to 35 U.S.C. § 119(a) to Japanese Patent Application No. 2018-040758, filed on Mar. 7, 2018 in the Japan Patent Office, the entire disclosure of which is hereby incorporated by reference herein.

BACKGROUND

Technical Field

Aspects of the present disclosure relate to a fabricating apparatus, a fabricating system, and a fabricating method.

Related Art

A fabricating apparatus (also referred to as a "3D printer") for fabricating a three-dimensional object according to input data has been developed. Various methods proposed as a method for performing three-dimensional fabrication include, for example, Fused Filament Fabrication (FFF), Selective Laser Sintering (SLS), Powder Sintered Stacking Fabrication Method, Material Jetting (MJ), an Electron Beam Melting (EBM) method, and a Stereolithography Apparatus (SLA) method.

There are cases, however, where a three-dimensional object of a desired shape cannot be fabricated, leading to a necessity to correct fabrication processing.

SUMMARY

In an aspect of the present disclosure, there is provided a fabricating apparatus that includes a fabricating device, a sensor, and a control unit. The fabricating device is configured to fabricate a fabrication layer according to fabrication data of a three-dimensional object. The sensor is configured to measure a shape of the fabrication layer. The control unit is configured to control the fabricating device according to the fabrication data and the shape of the fabrication layer measured with the sensor.

In another aspect of the present disclosure, there is provided fabricating system that includes a fabricating apparatus and a control device. The fabricating apparatus is configured to fabricate a three-dimensional object. The fabricating apparatus includes a fabricating device and a sensor. The fabricating device is configured to fabricate a three-dimensional object according to fabrication data. The sensor is configured to measure a shape of the fabrication layer fabricated with the fabricating device. The control device is configured to control an operation of the fabricating device according to the fabrication data and the shape of the fabrication layer measured with the sensor.

In still another aspect of the present disclosure, there is provided a method for fabricating a three-dimensional object. The method includes fabricating, measuring, and changing. The fabricating fabricates a fabrication layer according to fabrication data of the three-dimensional object. The measuring measures a shape of the fabrication layer. The changing changes fabricating operation according to the fabrication data and the shape of the fabrication layer measured by the measuring.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIGS. 7A to 7D are views each illustrating an example of correcting and fabricating a three-dimensional object in a second embodiment;

Figure 1A:
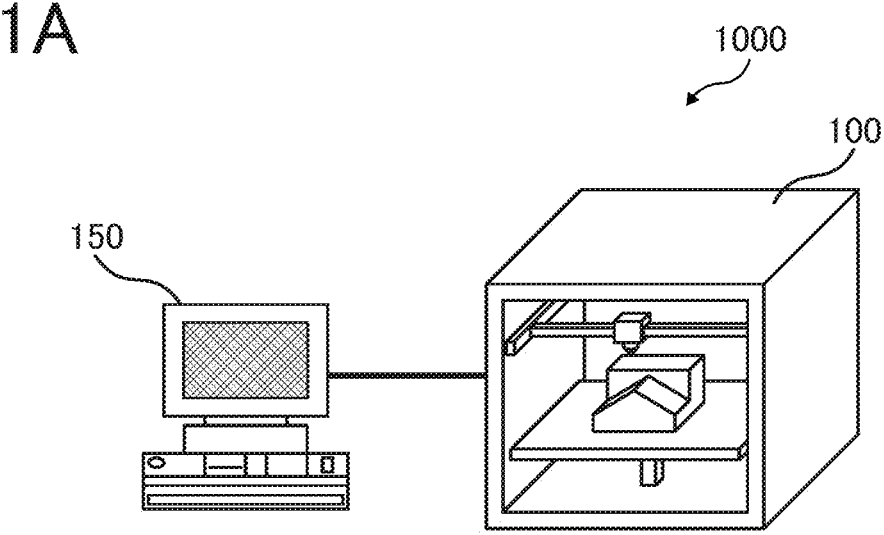
FIGS. 1A to 1C are diagrams each illustrating a schematic configuration of an entire three-dimensional fabricating system according to an embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

First, an example of a fabricating apparatus is described with reference to FIGS. 9A-1 to 9D. More specifically, FIGS. 9A-1 to 9A-3 illustrate an example of fabrication using the FFF method, and FIGS. 9B-1 to 9B-3 illustrate an example of fabrication using the SLS method.

Figure 2:
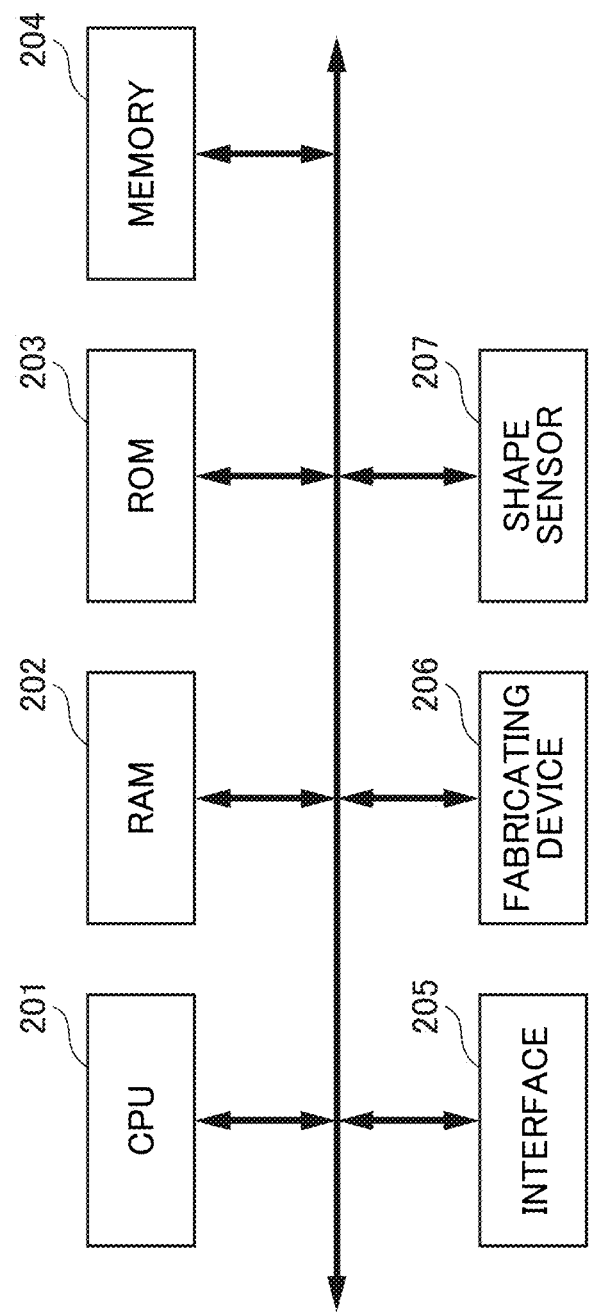
FIG. 2 is a diagram illustrating a hardware configuration included in a fabricating apparatus according to the present embodiment.
Figures 1, 9A:
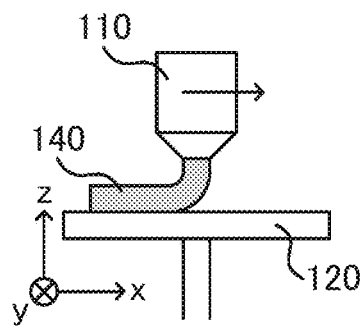
FIGS. 9A-1 to 9D are views each illustrating an example of fabricating a three-dimensional object in a comparative example.
Figures 2, 9A:
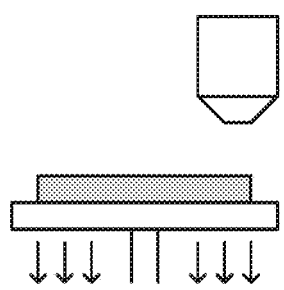
Figures 3, 9A:
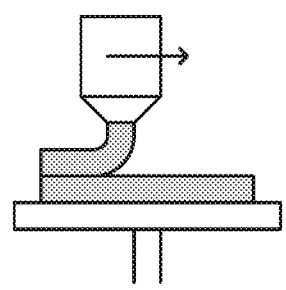
FIG. 3 is a software block diagram included in the fabricating apparatus according to the present embodiment.

In the FFF method, as illustrated in FIG. 9A-1, a molten fabrication material 140 is discharged from a head 110 at the top of a stage 120. The head 110 moves on an x-y plane on the stage 120 while discharging the fabrication material 140 to form a predetermined fabrication layer. Note that the stage 120 may be moved in the x-y plane while the head 110 is secured. When a single fabrication layer is formed, the stage 120 is lowered as illustrated in FIG. 9A-2. Thereafter, as illustrated in FIG. 9A-3, a next fabrication layer is to be fabricated on top of the already fabricated layer. Repeating this operation leads to formation of three-dimensional object as illustrated in FIG. 9C. Note that the head 110 may be moved to the top portion in the z-axis direction while the stage 120 is secured.

Figures 1, 9B:
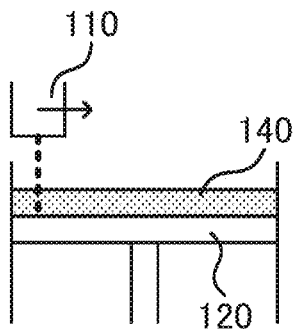
Figures 2, 9B:
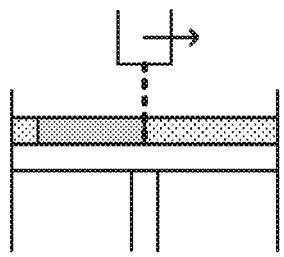
Figures 3, 9B:
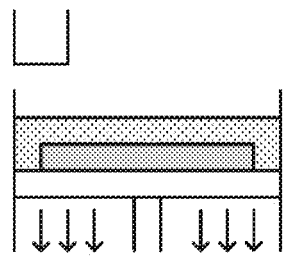
Figure 9C:
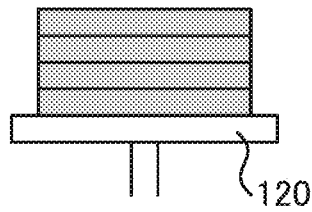
Figure 9D:
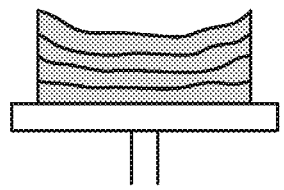

In the SLS method, as illustrated in FIG. 9B-1, a laser is selectively irradiated from the head 110 to the powdery fabrication material 140 spread on the stage 120. The fabrication material 140 selectively irradiated with the laser is locally and instantaneously melted by heat. The molten material is then cooled and cured. As illustrated in FIG. 9B-2, the head 110 moves parallel to the x-y plane on the stage 120 while irradiating the laser to form a predetermined fabrication layer. Note that the stage 120 may be moved in the x-y plane while the head 110 is secured. After a single fabrication layer has been formed, as illustrated in FIG. 9B-3, the stage 120 is lowered and then, the fabrication material 140 is spread again. Thereafter, processing returns to the operation of FIG. 9B-1. Repeating this operation leads to formation of three-dimensional object as illustrated in FIG. 9C. Note that the head 110 may be moved to the top portion in the z-axis direction while the stage 120 is secured.

However, the three-dimensional object is fabricated by the thermally fused fabrication material in typical three-dimensional fabrication, and a cooled fabrication material would leads to an occurrence of thermal deformation such as shrinkage or warpage in the course of fabricating or after fabricating. This results in fabrication of a three-dimensional object with low fabrication accuracy as illustrated in FIG. 9D in some cases. To avoid this, there used to be a restriction, that is, necessity to use a fabrication material having small thermal deformation.

Hereinafter, embodiments of the present disclosure will be described, although the present invention is not limited to each of embodiments described below. In each of the drawings referred to below, the identical reference numerals are used for identical elements, and the description thereof is omitted as appropriate. While the following description uses examples of fabricating apparatuses of the FFF method and the SLS method as main methods to implement embodiments of the present invention, another type of fabricating apparatus may be used.

In the following description, for the sake of convenience of explanation, the height direction of the three-dimensional object will be defined as a z-axis direction and the plane orthogonal to the z-axis will be defined as the x-y plane.

Figure 1B:
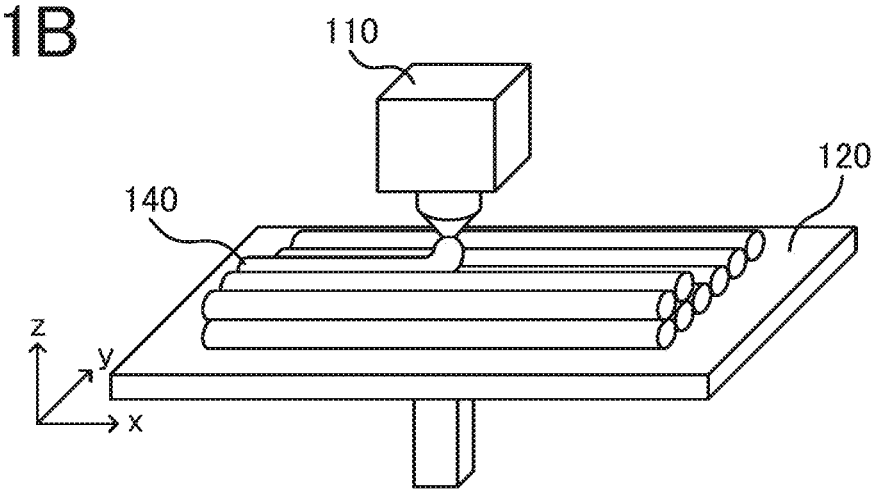
Figure 1C:
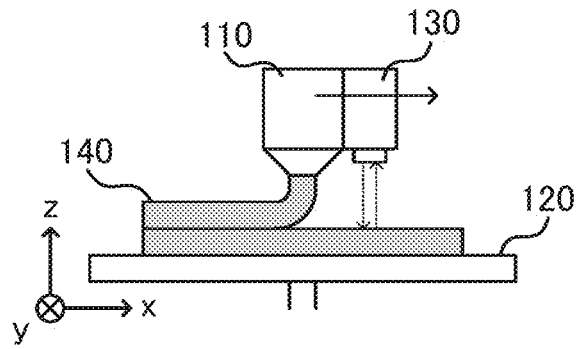

FIGS. 1A to 1C are diagrams each illustrating a schematic configuration of an entire three-dimensional fabricating system 1000 according to an embodiment of the present invention. As illustrated in FIG. 1A, the three-dimensional fabricating system 1000 includes a fabricating apparatus 100 that fabricates a three-dimensional object. The fabricating apparatus 100 fabricates a three-dimensional object according to shape data of the three-dimensional object to be fabricated transmitted from an information processing terminal 150, for example. The information processing terminal 150 may also operate as a control device that controls processing executed by the fabricating apparatus 100. Note that the function of the information processing terminal 150 may be incorporated in the fabricating apparatus 100.

As illustrated in FIG. 1B, the fabrication material 140 is discharged from the head 110 movable in parallel to the x-y plane onto the stage 120 so as to fabricate a layer shape on the x-y plane. One-dimensional line is drawn in an identical plane to fabricate a single fabrication layer out of the three-dimensional object. After fabrication of a first fabrication layer, the stage 120 is lowered by the height of one layer (stacking pitch) in the direction along the z-axis. Thereafter, the head 110 is driven similarly to the first layer to fabricate a second layer of the fabrication layer. The fabricating apparatus 100 repeats fabrication procedures to stack the fabrication layers so as to fabricate the three-dimensional object. While the above-described configuration is an example in which the head 110 moves in the x-y plane and the stage 120 moves in the z-axis direction, the configuration described above is not limited to the present embodiment, and other configurations may be adopted.

In addition, the fabricating apparatus 100 of the present embodiment includes a sensor 130 for measuring the shape of the fabrication layer being fabricated or an already-fabricated three-dimensional object. As illustrated in FIG. 1C, in a preferred embodiment, the sensor 130 may measure the shape of the fabrication layer during fabrication, for example, in conjunction with the fabricating operation performed by the head 110. In addition, the measurement of a three-dimensional object may be performed each time a single fabrication layer is fabricated. Note that the timing and range of the measurement of the three-dimensional object are optional, and the embodiment is not particularly limited by these.

Next, a hardware configuration of the fabricating apparatus 100 will be described. FIG. 2 is a diagram illustrating a hardware configuration included in the fabricating apparatus 100 according to the present embodiment. The fabricating apparatus 100 includes a central processing unit (CPU) 201, a random access memory (RAM) 202, a read-only memory (ROM) 203, a memory 204, an interface 205, a fabricating device 206, and a shape sensor 207. Each of these hardware components is interconnected via a bus.

The CPU 201 executes a program that controls the operation of the fabricating apparatus 100 to perform predetermined processing. The RAM 202 is a volatile memory for providing an execution space for a program to be executed by the CPU 201 and is used for storing and expanding programs and data. The ROM 203 is a nonvolatile memory for storing programs to be executed by the CPU 201, firmware, or the like.

The memory 204 is a readable/writable nonvolatile memory that stores an OS, various applications, setting information, various data, or the like, that allow the fabricating apparatus 100 to function. The interface 205 is a device that links the fabricating apparatus 100 with another device. The interface 205 can be linked with the information processing terminal 150, a network, an external memory, for example, and thus, it is possible to receive data for controlling fabricating operation and three-dimensional object shape data through the interface 205.

The fabricating device 206 is a device that fabricates a desired three-dimensional object out of the fabrication material 140. The fabricating device 206 is configured in accordance with the fabrication method, including the head 110 and the stage 120. For example, the fabricating device 206 using the FFF method further includes a heating mechanism for melting the fabrication material 140, a nozzle for discharging the fabrication material 140, or the like. The fabricating device 206 using the SLS system further includes a laser light source, or the like.

The shape sensor 207 is a device to measure the shape of a fabrication layer being fabricated or an already-fabricated three-dimensional object. The shape sensor 207 measures dimensions in the x-axis, y-axis, and z-axis directions of the three-dimensional object. Examples of the shape sensor 207 include an infrared sensor, a camera, and a 3D measurement sensor (for example, a light-section profile sensor).

Next, functions executed by individual hardware components in the present embodiment will be described with reference to FIG. 3 FIG. 3 is a block diagram of software included in the fabricating apparatus 100 according to the present embodiment.

The fabricating apparatus 100 includes a data input unit 310, a fabrication data generation unit 320, a fabricating device controller 330, an object shape measuring unit 340, a comparing unit 350, a correcting unit 360, and a storing unit 370.

The data input unit 310 receives an input such as shape data for fabricating a three-dimensional object. The shape data is created by the information processing terminal 150 or the like, as an example, and then input to the data input unit 310 via the interface 205.

The fabrication data generation unit 320 divides the shape data input to the data input unit 310 with respect to the height direction of the three-dimensional object, and generates fabrication data of a plurality of fabrication layers. The fabrication data of the three-dimensional object to be fabricated is divided in the unit of stacking pitch, so as to be generated as data representing a fabrication layer used for fabricating each of layers to be stacked. The fabrication data can be binary data indicating whether the data is to be fabricated in the x-y plane coordinates of each of the layers. Furthermore, in the preferred embodiment, parameters may include not merely whether fabrication is to be performed on each of coordinates but also the fabrication amount or the discharge amount of fabrication material 140 at each of coordinates. Note that while the fabrication data generation unit 320 is included in the fabricating apparatus 100 in FIG. 3, it may be included in the information processing terminal 150. In this case, the fabrication data generated by the information processing terminal 150 is transmitted to the fabricating apparatus 100 and then the fabrication processing is executed.

The fabricating device controller 330 as a control unit or control circuitry controls fabrication operation executed by the fabricating device 206, according to the fabrication data. The fabricating device controller 330 can adjust the position of the head 110 and the height of the stage 120 according to the fabrication data, achieving fabrication while controlling various parameters and algorithms such as fabrication speed and stacking pitch. Furthermore, the fabricating device controller 330 can control the fabrication amount according to the fabrication data. For example, the discharge amount of the fabrication material 140 can be controlled in the FFF method, while the intensity of the laser can be controlled in the SLS method.

The object shape measuring unit 340 controls the shape sensor 207 to obtain measurement data such as dimensions and height as a shape of a fabrication layer being fabricated or a shape of an already-fabricated three-dimensional object. The object shape measuring unit 340 obtains a measurement result as measurement data.

The comparing unit 350 compares the fabrication data with the measurement data obtained by the object shape measuring unit 340 and calculates an error that has occurred in fabrication from the difference between the two pieces of data. The shape of the three-dimensional object might vary in some cases depending on various conditions such as the type of the fabrication material 140 and the ambient temperature. The measurement data used here refers to data obtained by measuring a plurality of fabrication layers formed in the first layer to the n-th layer. Meanwhile, the fabrication material 140 might have shrinkage or warpage after being cooled or cured, as compared with immediately after fabrication. Continuing stacking with the shrinkage or the like being left as it is might result in fabrication of a three-dimensional object different from a desired three-dimensional object. To avoid this, an error between the fabrication data and the measurement data obtained by the object shape measuring unit 340 representing the shape of the actually obtained fabrication layer is fed back to the fabrication data for the subsequent layers and correction of the fabrication data is performed.

The correcting unit 360 corrects fabrication data used for fabricating a three-dimensional object. For example, the correcting unit 360 can correct the fabrication data to change the fabrication operation executed by the fabricating device controller 330 in accordance with the difference obtained by comparison performed by the comparing unit 350. Here, the change in the fabrication operation refers to a change in parameters or algorithms of the fabrication data. Examples of parameters and algorithms include a shape of a three-dimensional object to be fabricated, dimensions for each of fabrication layers, a height, a fabrication amount based on fabrication data, a melting temperature of fabrication material, a fabrication speed, and a stacking pitch. In a case where the fabrication data has been corrected, the fabricating device controller 330 executes fabrication processing according to the corrected fabrication data.

The storing unit 370 stores various data such as shape data, fabrication data, and measurement data, into the memory 204. Each of functional units performs writing and reading of various types of data to and from the storing unit 370.

Each of the functional units enables fabrication of three-dimensional objects with high accuracy.

Note that the above-described software block corresponds to a functional unit implemented by a function of each of hardware components achieved by execution of the programs of the present embodiment by the CPU 201. In addition, the functional units described in each of the embodiments may be entirely implemented by software, or may be partially or entirely implemented as hardware providing equivalent functions.

Figure 4:
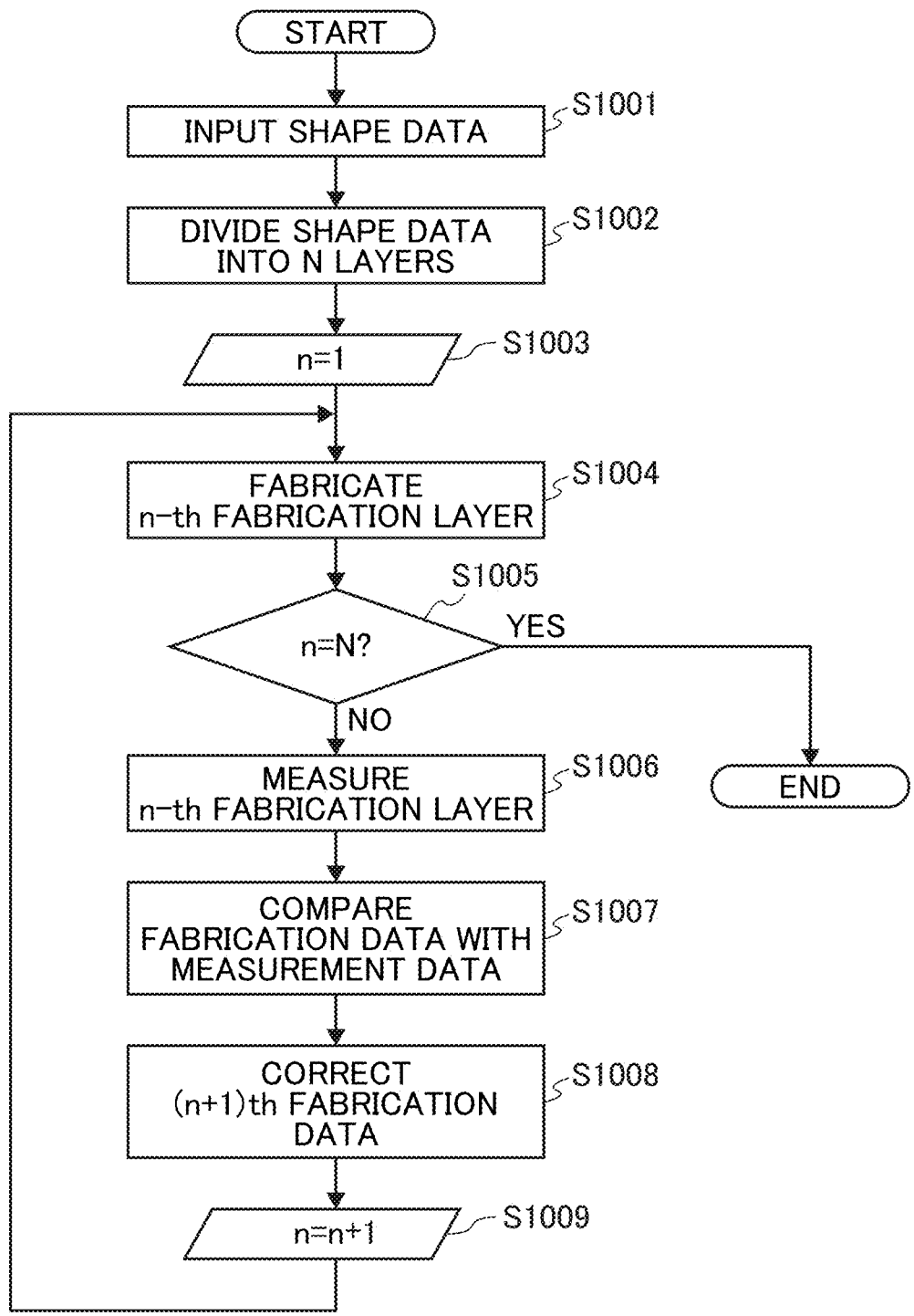
FIG. 4 is a flowchart of processing of fabricating a three-dimensional object by a fabricating apparatus in the present embodiment.

FIG. 4 is a flowchart illustrating three-dimensional object fabrication processing performed by the fabricating apparatus 100 in the present embodiment.

First, the fabricating apparatus 100 starts the fabrication processing in step S1000. In step S1001, the data input unit 310 receives an input of shape data. In step S1002, the fabrication data generation unit 320 generates fabrication data by dividing the input shape data into N layers with respect to the height direction of the three-dimensional object. The generated fabrication data may be stored in the storing unit 370.

Thereafter, n=1 is set in step S1003. In step S1004, the fabricating device controller 330 controls the operation of the fabricating device 206 according to the n-th layer fabrication data, so as to form the n-th layer of the fabrication layer. In step S1005, the processing is branched depending on whether n=N is satisfied. That is, when n is equal to N (YES), it is determined that all the fabrication layers are fabricated to have completed fabrication of three-dimensional object, and then, the flow branches to step S1010 to finish the fabrication processing. In a case where n is not equal to N (NO), this means there is still incomplete fabrication layers, and thus, the processing branches to step S1006 to fabricate the next layer.

In step S1006, the object shape measuring unit 340 measures the shape of the fabrication layer of the n-th layer that has been fabricated.

In step S1007, the comparing unit 350 compares the fabrication data for the n-th layer with measurement data for the n-th layer and calculates a difference accordingly. Next, in step S1008, the correcting unit 360 corrects the fabrication data for the (n+1)th layer on the basis of the difference obtained for the n-th layer. Note that the correction processing may be performed for each of layers or may be performed on the basis of a difference between a plurality of layers. The difference of individual layers may be stored in the storing unit 370 as appropriate. The correcting unit 360 may read the difference of individual layers stored in the storing unit 370 and may correct the fabrication data for the (n+1)th layer on the basis of the difference obtained for the first layer to the n-th layer.

Thereafter, in step S1009, the value n is counted up to n+1, and the processing returns to step S1004. Here, in the processing of step S1004 to be executed for the second and subsequent times, fabrication is performed by using the corrected fabrication data. The fabricating apparatus 100 repeats the above-described processing of steps S1004 to S1009 until fabrication based on the N-th layer fabrication data is completed.

Using the processing of the flowchart described above to feed back the difference based on the fabrication layer to the next layer to be stacked would make it possible to change the fabricating operation, enabling fabrication of a desired three-dimensional object.

Figure 5A:
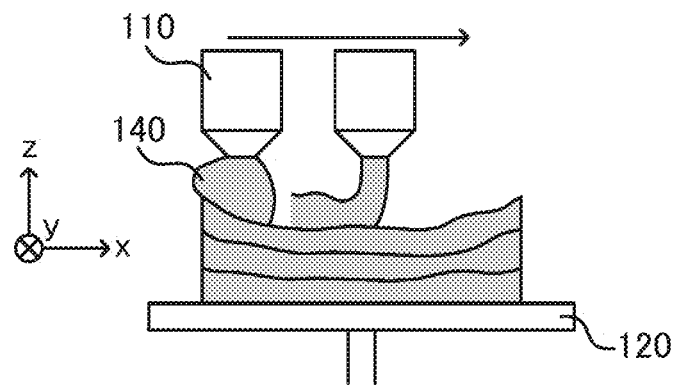
FIGS. 5A to 5C are views each illustrating an example in which a three-dimensional object is corrected and fabricated in a first embodiment.
Figure 5B:
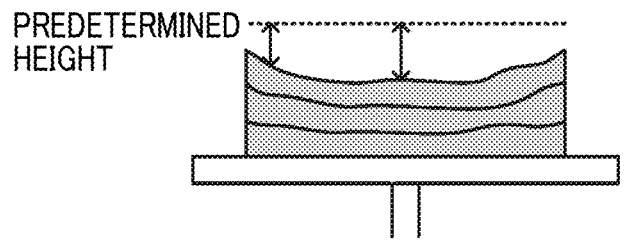
Figure 5C:
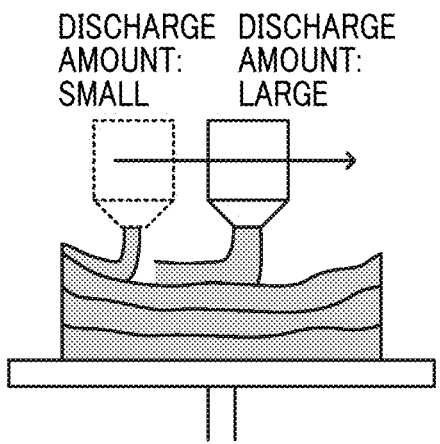
Figure 6:
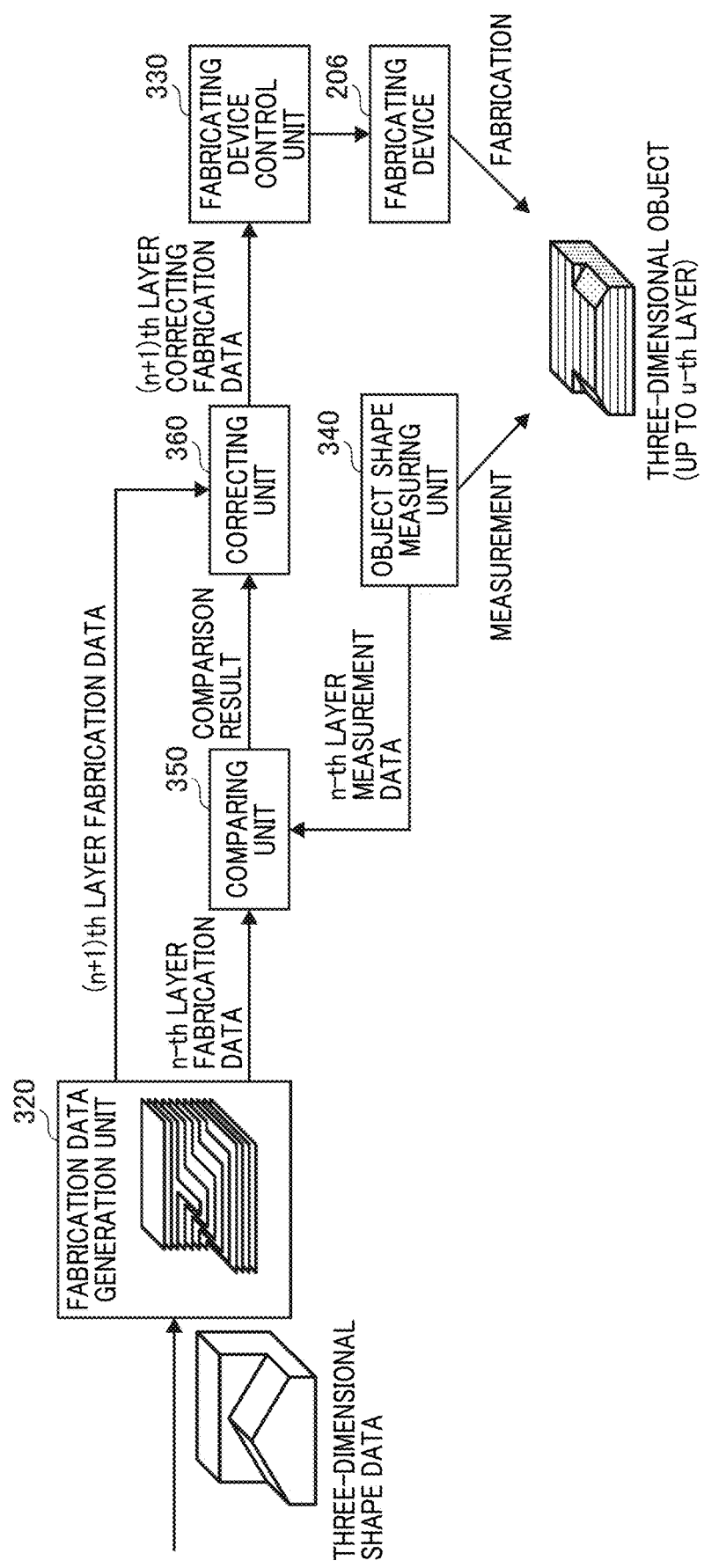
FIG. 6 is a diagram illustrating a data flow in the first embodiment.

FIGS. 5A to 5C are views illustrating an example in which a three-dimensional object is corrected and fabricated in the first embodiment. The first embodiment represents an example of correcting the height in the x-y plane within a layer to be uniform in a three-dimensional object having warpage. FIG. 6 is a diagram illustrating a data flow in the first embodiment.

For example, as illustrated in FIG. 5A, continuing the fabricating operation with warpage generated in the three-dimensional object would produce a region where the height of the three-dimensional object is increased due to the warpage. The distance between the three-dimensional object and the head 110 is reduced in this region, blocking the discharge port with the discharged fabrication material 140, so as to allow the fabrication material 140 to expand in the lateral direction, resulting in degradation of fabrication accuracy.

In addition, since the discharge port is blocked, the pressure inside the nozzle might be raised by the fabrication material 140 in some cases. Movement of the head 110 to a region with the three-dimensional object having a low height without warpage in this state would release the pressure inside the nozzle, leading to a larger discharge amount of the fabrication material 140 than a predetermined amount, resulting in degradation of fabrication accuracy.

To avoid this, as illustrated in FIG. 5B, the height of the fabricated three-dimensional object is measured and then, fabrication is performed by correcting the height of the fabrication layer to be stacked on top of the three-dimensional object.

As illustrated in FIG. 6, the fabrication data generation unit 320 first generates fabrication data obtained by dividing the shape data input to the data input unit 310 into N layers. The generated fabrication data of each of layers may be temporarily stored in the storing unit 370. The fabricating device controller 330 controls the operation of the fabricating device 206 according to the fabrication data read from the storing unit 370, and forms a fabrication layer of each of the layers. Here, the three-dimensional object is assumed to be fabricated up to the n-th layer.

The three-dimensional object fabricated up to the n-th layer is measured by the object shape measuring unit 340 and the result is obtained as measurement data of the three-dimensional object for the n-th layer. Here, the measurement data is data indicating the z-coordinates in each of (x, y) coordinate of the three-dimensional object, that is, the height of the object. Hereinafter, measurement data will be denoted as n-th layer measurement data.

The comparing unit 350 compares the n-th layer measurement data with the fabrication data of the n-th layer.

The correcting unit 360 corrects the fabrication data for the (n+1)th layer stacked on top of the n-th layer according to the comparison result. Hereinafter, the corrected fabrication data will be denoted as the (n+1)th layer correcting fabrication data. The (n+1)th layer correcting fabrication data includes parameters for adjusting the discharge amount, enabling the discharge amount of the fabrication material 140 to be adjusted to achieve a uniform height of the respective layers.

The fabricating device controller 330 operates the fabricating device 206 on the basis of the (n+1)th layer correcting fabrication data to form the (n+1)th layer. For example, as illustrated in FIG. 5C, the discharge amount of the fabrication material 140 is decreased in a region where the height is increased due to warpage, while the discharge amount of the fabrication material 140 is increased in a region where the height is low. This can correct the height of the three-dimensional object to be uniform, leading to enhancement of the fabrication accuracy.

The first embodiment is an example of adjusting the discharge amount to correct the shape of the three-dimensional object in the FFF method, etc. In the SLS system or the like, the shape may be corrected by the method described in a second embodiment below.

FIGS. 7A to 8D are views each illustrating an example of correcting and fabricating a three-dimensional object in the second embodiment. FIGS. 7A to 7D illustrate correction in a case where the height of the three-dimensional object is lower than a predetermined height. FIGS. 8A to 8D illustrate correction in a case where the height of the three-dimensional object is below the predetermined height.

First, FIGS. 7A to 7D will be described. FIG. 7A illustrates a case where warpage occurs in a three-dimensional object, resulting in a state where the three-dimensional object fabricated up to the n-th layer includes a region lower than a predetermined height. Using fabrication data generated by the fabrication data generation unit 320 as it is in fabricating the fabrication layer of the (n+1)th layer would result in fabricating the layers in a shape reflecting the warpage of the layer below the (n+1)th layer. To cope with this, as illustrated in FIG. 7B, an n'th layer having a shape lower than a threshold out of the regions lower than a predetermined height is added between the n-th layer and the (n+1)th layer in execution of fabrication. Thereafter, as illustrated in FIG. 7C, fabricating the (n+1)th layer after fabricating the n'th layer would make it possible to fabricate a three-dimensional object that has reduced the influence of the lower layer warpage onto the degradation of the accuracy. As illustrated in FIG. 7D, the shape of the n'th layer is a shape to complement a region lower than a predetermined height (shape indicated by a solid line) among the shape of the (n+1)th layer (shape indicated by a broken line).

Figure 8A:
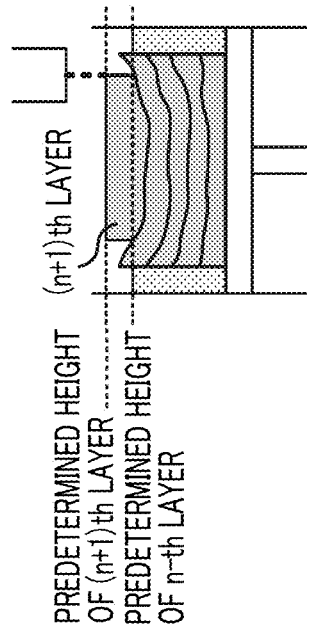
FIGS. 8A to 8D are views illustrating an example of correcting and fabricating a three-dimensional object in the second embodiment.
Figure 8C:
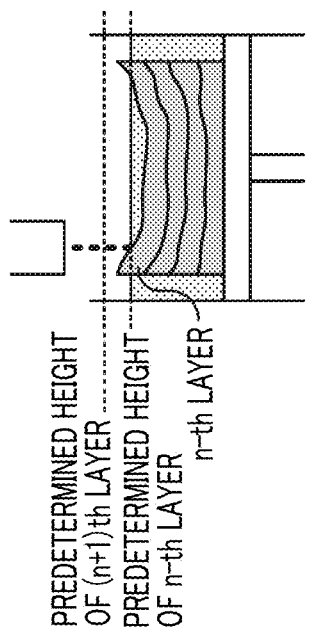
Figure 8B:
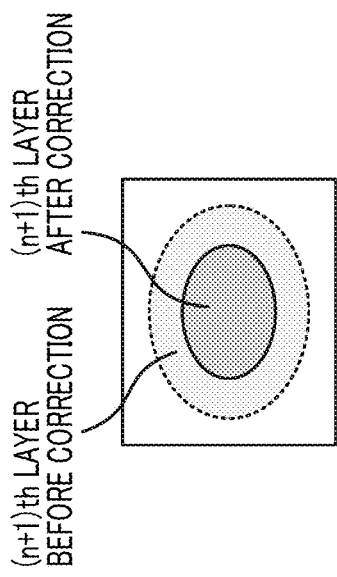
Figure 8D:
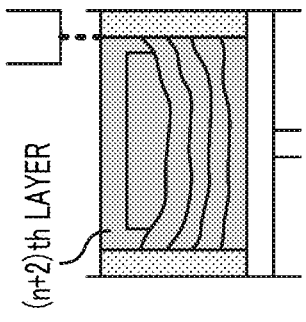

Next, FIGS. 8A to 8D will be described. FIG. 8A illustrates a case where warpage occurs in a three-dimensional object, resulting in a state where the three-dimensional object fabricated up to the n-th layer includes a region higher than a predetermined height. Using fabrication data generated by the fabrication data generation unit 320 as it is in fabricating the fabrication layer of the (n+1)th layer would result in fabricating the layers in a shape reflecting the warpage of the layer below the (n+1)th layer. Accordingly, as illustrated in FIG. 8B, a region higher than the predetermined height of the n-th layer out of the (n+1)th layer to be formed on top of the n-th layer is thinned out in fabrication. Thereafter, forming a (n+2)th layer as illustrated in FIG. 8C makes it possible to fabricate a three-dimensional object that has reduced the influence of the warpage of the lower layers onto degradation of the accuracy. Note that the shape of the (n+1)th layer thus corrected has a shape (shape illustrated by the solid line) obtained by removing the region higher than the predetermined height from the shape of the (n+1)th layer (shape indicated by the broken line) as illustrated in FIG. 8D.

In the second embodiment, the object shape measuring unit 340 measures the height of the three-dimensional object up to the n-th layer similarly to the first embodiment. Subsequently, the comparing unit 350 compares the measured height with the height in the fabrication data. The correcting unit 360 performs correction of adding the n'th layer as illustrated in FIGS. 7A to 7D or correction of thinning out the shape of the (n+1)th layer as illustrated in FIGS. 8A to 8D, on the basis of the comparison result.

According to the embodiments of the present invention described above, it is possible to provide a fabricating apparatus, a fabricating system and a method for fabricating a desired three-dimensional object.

The functions of the embodiments of the present invention described above can be implemented by a machine-executable program written in C, C++, C#, Java (registered trademark), or the like. The program of the present embodiment can be distributed in a machine-readable recording medium such as a hard disk device, a CD-ROM, an MO, a DVD, a flexible disk, an EEPROM, an EPROM, etc., and can be transmitted via a network in a format that is readable by other machines.

While the embodiments of the present invention have been described above, the present invention is not limited to the above-described embodiments, and the technology capable of achieving advantageous effects of the present invention should be included within the scope of the present invention within a range of modes that can occur to those skilled in the art.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A fabricating apparatus, comprising:
a fabricating device configured to fabricate an nth fabrication layer according to fabrication data of a three-dimensional object;
a sensor configured to measure a height from the fabricating device to the nth fabrication layer; and
a controller configured to control the fabricating device according to the fabrication data and the height measured with the sensor, wherein the controller is further configured to:
control the fabricating device upon the height of an nth fabrication layer, measured by the sensor, being greeter than or equal to a first threshold height and, control the fabricating device for an (n+1)th fabrication layer,
to fabricate a first region relatively lower than the first threshold height, and to not fabricate a second region relatively higher than the first threshold height, wherein (n+1)th fabrication layers include the first region and the second region.

2. The fabricating apparatus of claim 1,
wherein the fabricating device is configured to divide the three-dimensional object into a plurality of sliced layers in a vertical direction and is configured to fabricate the plurality of sliced layers as a plurality of fabrication layers including the fabrication layer, and
the controller is configured to change fabrication data indicating a relatively upper fabrication layer to be fabricated on top of the fabrication layer including the height measured with the sensor.

3. The fabricating apparatus of claim 1,
wherein the sensor is configured to measure a height of the fabrication layer, and
wherein, upon a region of the fabrication layer measured with the sensor including a threshold height or a height relatively higher than the threshold height, the controller is configured to control the fabricating device not to fabricate another (n+1) fabrication layer onto the region including the threshold height or a height relatively higher than the threshold height.

4. The fabricating apparatus of claim 3,
wherein upon a region measured with the sensor including the threshold height or a height relatively higher than the threshold height,
the controller is configured to control the fabricating device to fabricate a relatively upper fabrication layer to be fabricated on top of the fabrication layer measured with the sensor, in another region different from the region measured with the sensor.

5. The fabricating apparatus of claim 1,
wherein the controller is configured to control the fabricating device to add another (n+1) fabrication layer in accordance with the height measured with the sensor.

6. The fabricating apparatus of claim 1, wherein upon a region of the fabrication layer measured with the sensor including a height relatively lower than a threshold height, the controller is configured to control the fabricating device to increase an amount of fabrication material.

7. The fabricating apparatus of claim 1,
wherein the sensor is configured to measure a height of the fabrication layer, and
wherein, upon a region of the fabrication layer measured with the sensor including a threshold height or a height relatively higher than the threshold height, the controller is configured to control the fabricating device to fabricate another (n+1) fabrication layer, in a region relatively lower than the threshold height.

8. The fabricating apparatus of claim 1, wherein the controller is further configured to:
control the fabricating device in fabricating an (n+2)th fabrication layer, to fabricate a region to a second threshold height.

9. A method for fabricating a three-dimensional object, the method, comprising:
fabricating, via a fabricating device, an nth fabrication layer according to fabrication data of the three-dimensional object;
measuring a height from the fabricating device to the nth fabrication layer; and changing a fabricating operation of the nth fabrication layer according to the fabrication data and the height measured, the changing of the fabricating operation including controlling the fabricating device upon the height of the nth fabrication layer, measured by the sensor, being greater than or equal to a first threshold height and, for an (n+1)th fabrication layer, controlling the fabricating device to fabricate a first region relatively lower than the first threshold height, and to not fabricate a second region relatively higher than the first threshold height, wherein (n+1)th fabrication layers include the first region and the second region.

10. The method of claim 9, wherein upon the measuring indicating that a region of the fabrication layer includes a threshold height or a height relatively lower than the threshold height, the fabricating device is controlled to increase an amount of fabrication material.

11. The method of claim 9, wherein the measuring includes measuring a height of the fabrication layer, and wherein, upon the measuring indicating that a region of the fabrication layer includes a threshold height or a height relatively higher than the threshold height, the fabricating device is controlled to not fabricate another (n+1) fabrication layer onto the region including the threshold height or a height relatively higher than the threshold height.

12. The method of claim 9, wherein the measuring includes measuring a height of the fabrication layer, and wherein, upon the measuring indicating that a region of the fabrication layer includes a threshold height or a height relatively higher than the threshold height, the fabricating device is controlled to fabricate another (n+1) fabrication layer, in a region relatively lower than the threshold height.

13. The method of claim 9, further comprising:

controlling the fabricating device in fabricating an (n+2)th fabrication layer, to fabricate a region to a second threshold height.

14. A non-transitory computer readable medium storing a computer program including computer code, for execution by at least one processor, the at least one processor, upon execution of the computer code, being configured to fabricate a three-dimensional object via a method, comprising:

fabricating, via a fabricating device, an nth fabrication layer according to fabrication data of the three-dimensional object;

measuring a height from the fabricating device to the nth fabrication layer; and changing a fabricating operation of the nth fabrication layer according to the fabrication data and the height measured, the changing of the fabricating operation including controlling the fabricating device upon the height of the nth fabrication layer, measured by the sensor, being greater than or equal to a first threshold height and for an (n+1)th fabrication layer, controlling the fabricating device to fabricate a first region relatively lower than the first threshold height, and to not fabricate a second region relatively higher than the first threshold height, wherein (n+1)th fabrication layers include the first region and the second region.

15. The non-transitory computer readable medium of claim 14, wherein the at least one processor, upon execution of the computer code and upon the measuring indicating that a region of the fabrication layer includes a threshold height or a height relatively lower than the threshold height, is configured to control the fabricating device to increase an amount of fabrication material.

16. The non-transitory computer readable medium of claim 14, wherein the at least one processor, upon execution of the computer code and upon the measuring indicating that a region of the fabrication layer includes a threshold height or a height relatively lower than the threshold height, is configured to control the fabricating device not fabricate another (n+1) fabrication layer onto the region including the threshold height or a height relatively higher than the threshold height.

17. The non-transitory computer readable medium of claim 14, wherein the at least one processor, upon execution of the computer code and upon the measuring indicating that a region of the fabrication layer includes a threshold height or a height relatively lower than the threshold height, is configured to control the fabricating device to fabricate another (n+1) fabrication layer, in a region relatively lower than the threshold height.

18. The non-transitory computer readable medium of claim 14, wherein the at least one processor, upon execution of the computer code, is configured to control the fabricating device in fabricating an (n+2)th fabrication layer, to fabricate a region to a second threshold height.

* * * * *